(12) United States Patent
Ullmann et al.

(10) Patent No.: US 12,321,762 B2
(45) Date of Patent: Jun. 3, 2025

(54) AUTOMATED COGNITIVE ANALYSIS AND SPECIALIZED SKILLS CAPTURE

(71) Applicant: International Business Machines Corporation, Armonk, NY (US)

(72) Inventors: Lorin Ullmann, Austin, TX (US); Denise Bell, Austin, TX (US); Eric E. Goodson, Research Triangle Park, NC (US); Zakary Crapo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 16/459,208

(22) Filed: Jul. 1, 2019

(65) Prior Publication Data

US 2021/0004246 A1    Jan. 7, 2021

(51) Int. Cl.
| | | |
|---|---|---|
| G06Q 10/00 | (2023.01) | |
| G06F 9/451 | (2018.01) | |
| G06F 11/34 | (2006.01) | |
| G09B 19/00 | (2006.01) | |
| G06Q 10/0631 | (2023.01) | |

(52) U.S. Cl.
CPC .......... *G06F 9/453* (2018.02); *G06F 11/3438* (2013.01); *G09B 19/0053* (2013.01); *G06Q 10/06316* (2013.01)

(58) Field of Classification Search
CPC ............... G06F 9/453; G06F 11/3438; G06F 11/079–0796; G06Q 10/06316–0633
See application file for complete search history.

(56) References Cited

U.S. PATENT DOCUMENTS

| 6,108,700 A | * | 8/2000 | Maccabee ........... H04L 41/0631 709/224 |
| 7,321,886 B2 | | 1/2008 | Swaminathan et al. |
| 8,533,608 B1 | | 9/2013 | Tantiprasut |
| 9,891,971 B1 | | 2/2018 | Kuhhirte |

(Continued)

OTHER PUBLICATIONS

How to create a drop down menu based on a field in a table?, ServiceNow Community, Ben67, Kilo Contributor, Jul. 18, 2018 (Year: 2018).*

(Continued)

*Primary Examiner* — Hafiz A Kassim
*Assistant Examiner* — Scott M Ross
(74) *Attorney, Agent, or Firm* — Teddi Maranzano, Esq.; Rachel L. Pearlman, Esq.; Heslin Rothenberg Farley & Mesiti P.C.

(57) ABSTRACT

A method, computer program product, and a system where a processor(s) monitors tasks performed within the shared computing environment by an authorized user via an interface(s) of a computing system. The processor(s) determines that the authorized user is initiating a given task and queries a repository to determine if the repository comprises a runbook comprising guidance relevant to the given task. The processor(s) determines that the repository does not comprise the runbook and automatically initiates a device(s) to capture and cognitively analyze activities performed by the authorized user to complete the given task (e.g., an audio capture device and a screen recorder). The processor(s) determine that the authorized user has completed the given task and stop the capturing and generate the runbook from the captured activities.

15 Claims, 6 Drawing Sheets

(56) References Cited

U.S. PATENT DOCUMENTS

| | | | |
|---|---|---|---|
| 11,276,400 B2* | 3/2022 | Danila | G10L 15/22 |
| 2006/0184410 A1* | 8/2006 | Ramamurthy | G06Q 10/10 |
| | | | 706/8 |
| 2008/0126283 A1 | 5/2008 | Odom et al. | |
| 2009/0210225 A1* | 8/2009 | Simpson | G10L 15/26 |
| | | | 704/235 |
| 2012/0303772 A1 | 11/2012 | Ennis | |
| 2013/0097497 A1* | 4/2013 | Matejka | G06F 3/048 |
| | | | 715/705 |
| 2015/0309811 A1* | 10/2015 | Wisgo | G06F 21/54 |
| | | | 719/331 |
| 2017/0011322 A1* | 1/2017 | Thomas | G06Q 10/067 |
| 2017/0090736 A1* | 3/2017 | King | G06F 3/04842 |
| 2018/0061399 A1* | 3/2018 | Rose | G10L 15/22 |
| 2018/0137094 A1* | 5/2018 | Zhou | G06F 40/205 |
| 2018/0348997 A1* | 12/2018 | Wang | G06F 11/3438 |
| 2019/0391892 A1* | 12/2019 | Sabharwal | G06N 3/02 |
| 2019/0392286 A1* | 12/2019 | Chen | G06N 5/043 |
| 2020/0004618 A1* | 1/2020 | Thornhill | G06F 16/907 |
| 2020/0312299 A1* | 10/2020 | Nama | G10L 15/063 |
| 2021/0042134 A1* | 2/2021 | Elango | G06F 11/3438 |

OTHER PUBLICATIONS

Dropdown List Fields Formstack Help Jan. 7, 2022; Knowledge (Year: 2022).*
How to create multiple drop downs in one product? AdobeForums, Ccondra, Adobe Team, Jul. 15, 2015. (Year: 2015).*
Link dropdown choice to autofill a second field, AdobeCommunity, bpwhistler, Apr. 0-7, 2015. (Year: 2015).*
Mell et al., "The NIST Definition of Cloud Computing", National Institute of Standards and Technology, U.S. Dept. of Commerce, NIST Special Publ. 800-145, Sep. 2011, 7 pages.
IBM, "IBM Runbook Automation Guide." SC27-8766-03. Last update: Mar. 8, 2018. (Accessed Apr. 5, 2018), https://www.ibm.com/support/knowledgecenter/SSZQDR/com.ibm.rba.doc/rba_pdf_guide.pdf.

* cited by examiner

AUTOMATED COGNITIVE ANALYSIS AND SPECIALIZED SKILLS CAPTURE

BACKGROUND

A constant barrier to maintaining efficiencies within an organization is the departure of subject matters experts (SMEs), who, when they leave, take with them institutional knowledge, as well as other specific knowledge regarding how to accomplish various tasks and projects in an effective manner that optimizes the use of organizational resources. Even when an SME does not depart an organization, process bottlenecks can occur because the SME for a particular task or project is otherwise engages or unavailable and the specialized knowledge of the SME regarding how to best (or at all) complete the task or project is not held by any other assets within the organization.

Presently, attempts are made to preserve as well as to disperse (to others) SMEs' knowledge. These attempts are generally made via knowledge transfers. In a knowledge transfer, a first entity (e.g., an SME) transfers knowledge of a distinct task or project to another entity. This transfer can include a transfer of assets, including, but not limited to documents, presentations, and/or demonstrations, etc. The second entity, who is receiving the knowledge in the transfer, may also be asked to attend a number of in-person and/or remote training sessions with the first entity. The second entity may also be required to perform an automated training pattern to machine-learn the knowledge. During these training sessions, important information can be exchanged, from the first entity to the second entity, utilizing a variety of electronic communication methods. But because during these training sessions, in particular, discussions between entities, such as those that occur over messaging applications, are not memorialized, valuable information can be lost. For example, chat discussion topics and chat participant contacts can be an important part of a knowledge transfer that is not memorialized or retained in a form that is of use to future entities attempting to reconstruct the transferred knowledge when an initial SME is no longer available.

SUMMARY

Shortcomings of the prior art are overcome and additional advantages are provided through the provision of a method for automated electronic knowledge transfer. The method includes, for instance: monitoring, by one or more processors in a shared computing environment, tasks performed within the shared computing environment by an authorized user via at least one interface of a computing system; determining, by the one or more processors, based on the monitoring, that the authorized user is initiating a given task, wherein the given task is a recurring administrative task within the shared computing environment; querying, by the one or more processors, a repository accessible to the one or more processors in a shared computing environment to determine if the repository comprises a runbook comprising guidance relevant to the given task; based on the querying, determining, that the repository does not comprise the runbook; based on the determining, automatically initiating one or more devices of the computing system to capture and cognitively analyze activities performed by the authorized user to complete the given task, wherein the one or more devices comprise an audio capture device and a screen recorder; determining, by the one or more processors, based on the monitoring, that the authorized user has completed the given task; stopping, by the one or more processors, the capturing by the one or more devices of the activities performed by the authorized user; and generating, by the one or more processors, the runbook comprising the guidance relevant to the given task from the captured activities.

Shortcomings of the prior art are overcome and additional advantages are provided through the provision of a computer program product for automated electronic knowledge transfer. The computer program product comprises a storage medium readable by a processing circuit and storing instructions for execution by the processing circuit for performing a method. The method includes, for instance: monitoring, by one or more processors in a shared computing environment, tasks performed within the shared computing environment by an authorized user via at least one interface of a computing system; determining, by the one or more processors, based on the monitoring, that the authorized user is initiating a given task, wherein the given task is a recurring administrative task within the shared computing environment; querying, by the one or more processors, a repository accessible to the one or more processors in a shared computing environment to determine if the repository comprises a runbook comprising guidance relevant to the given task; based on the querying, determining, that the repository does not comprise the runbook; based on the determining, automatically initiating one or more devices of the computing system to capture and cognitively analyze activities performed by the authorized user to complete the given task, wherein the one or more devices comprise an audio capture device and a screen recorder; determining, by the one or more processors, based on the monitoring, that the authorized user has completed the given task; stopping, by the one or more processors, the capturing by the one or more devices of the activities performed by the authorized user; and generating, by the one or more processors, the runbook comprising the guidance relevant to the given task from the captured activities.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
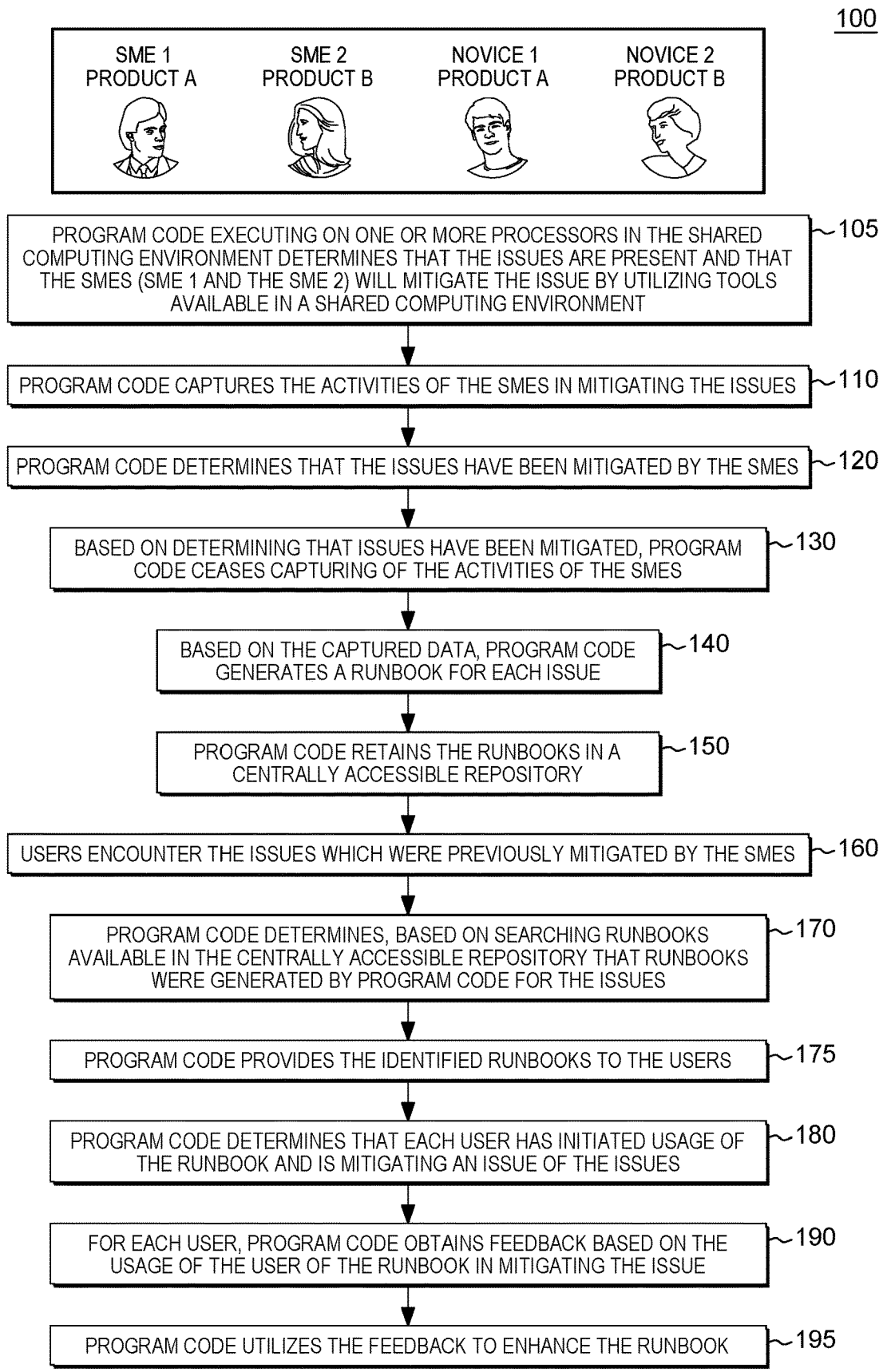
FIG. 1 is a workflow illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
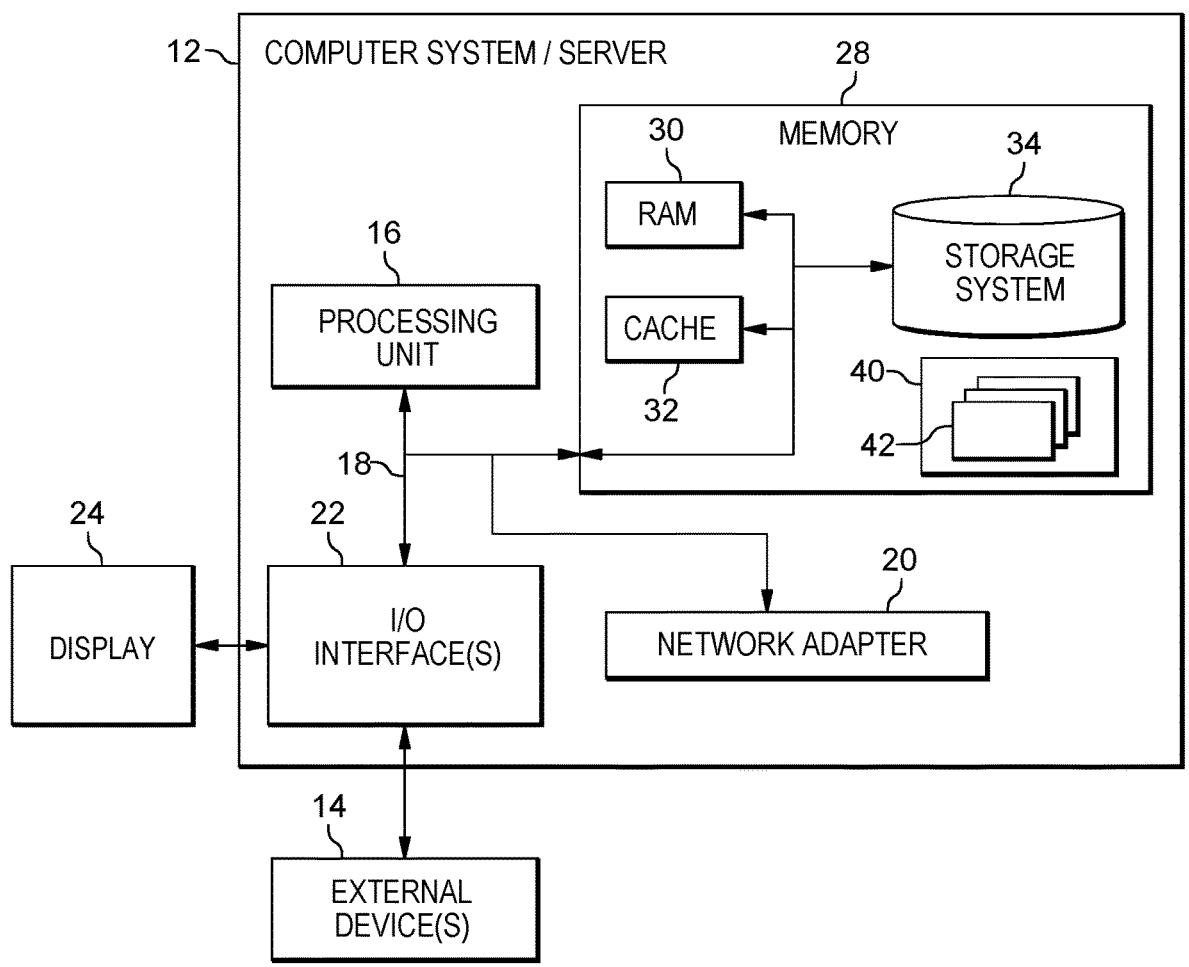
FIG. 5 depicts one embodiment of a computing node that can be utilized in a cloud computing environment.
Figure 6:
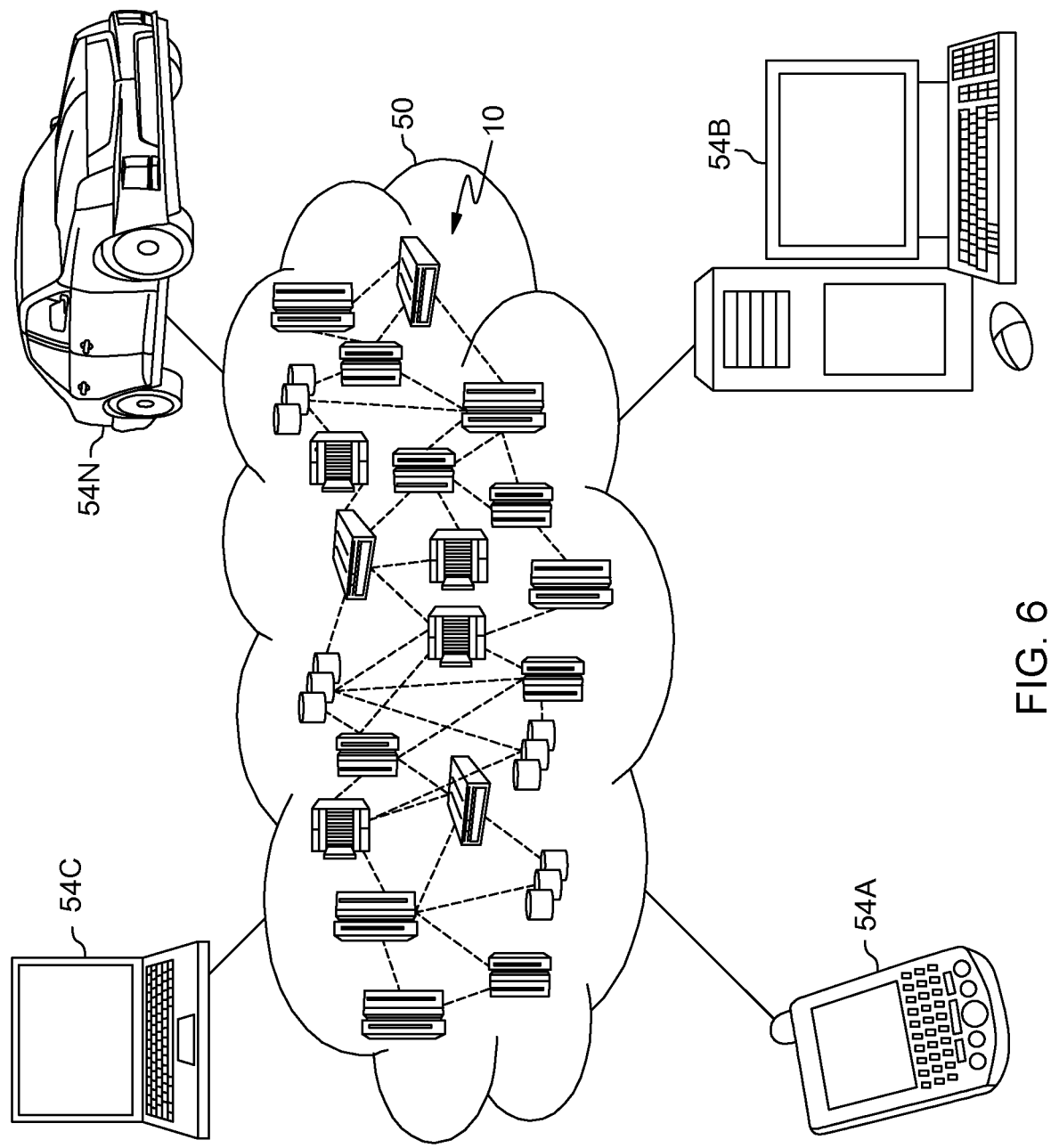
FIG. 6 depicts a cloud computing environment according to an embodiment of the present invention.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Embodiments of the present invention include a computer-implemented method, a computer program product, and a computer system, where program code executing on at least one processing device automates skills/knowledge transfer processes to generate a library of runbooks that address various issues and contain processes that can be utilized to mitigate these various issues. As understood by one of skill in the art, a runbook is a compilation of routine procedures and operations that can be executed by a user and/or a process. In some embodiments of the present invention, the content of certain of the runbooks can be read and automatically executed by a process. In other embodiments of the present invention, the program code generates the runbooks, which are utilized by one or more users, to manually execute the processes captured in the runbooks. The term runbook is used generally and can include one or more files that comprise a skills transfer package that can be utilized to communicate to and/or train a less familiar user in an aspect of a shared computing environment. In some embodiments of the present invention, each runbook covers a distinct issue within a distinct portion (product, application, software device, hardware device, etc.) with a shared computing environment.

Aspects of some embodiments of the present invention include, but are not limited to: 1) program code identifying an issue in a computing environment and determining that no procedure (runbook, script, process) was previously generated for addressing the issue; 2) program code initiating a recording of actions performed in the computing environment by a user identified as a subject matter expert, including audio and video files created by the SME (actively and/or passively) that illustrate the actions utilized to mitigate the issue; 3) program code capturing communications between this user and other users identified as SMEs during issue mitigation; 4) program code capturing data relevant to trouble-shooting during the issue mitigation, including but not limited to attempts to resolve the issue by the SME that are both successful and not successful at mitigating the issue; 4) program code determining that the issue has been mitigated and based on this determination, compiling the recorded and captured data (commands, tools, texts, etc.) into a runbook.

Some embodiments of the present invention are inextricably linked to computing and include aspects that provide advantages over existing issue mitigation and knowledge transfer approaches utilized to maintain and/or increase efficiency in a computing environment. Embodiments of the present invention are inextricably linked to computing at least because they address problem solving of issues identified within computing environments by utilizing available tools within the computing environment. The methods for utilizing the tools are provided to users and processes by automatically generated runbooks, which are generated based on identifying issues and utilizing elements within the computing system to capture the mitigation of the issue such that this mitigation can be repeatable by other users and/or processes. Some embodiments of the present invention are inextricably linked to computing because they utilize cognitive analysis method in modeling various data into distinct expert approaches to specific issues within a shared computing environment. As will be described in greater detail herein, in some embodiments of the present invention, program code executing on one or more processors utilizes aspects, including Application Program Interfaces (APIs), of an existing cognitive analysis tools to perform analyses of the captured data. Some embodiments of the present invention utilize IBM Watson® as a cognitive agent to perform one or more of the described analyses. IBM Watson® is a product of International Business Machines Corporation. IBM Watson® is a registered trademark of International Business Machines Corporation, Armonk, N.Y., US. In embodiments of the present invention, the program code interfaces with IBM Watson® APIs to perform analyses of the data (e.g., audio and video data streams captured based on actions of the SME, actions performed by the SME through a user interface, utilization of the SME of various tools, communications of the SME with other users of the system during issue mitigation, etc.). APIs of IBM Watson® that can be utilized in various embodiments of the present invention to perform the described analyses include, but are not limited to, natural language classifiers, Retrieve and Rank (i.e., a service available through the IBM Watson® Developer Cloud that can surface the most relevant information from a collection of documents), Tone Analyzer, concepts/visual insights, trade off analytics, document conversion, relationship extraction, natural language processing, text to speech capabilities, and/or translation. Various cognitive analysis algorithms can be utilized to parse the data collected and to filter the collected data into a runbook targeted to a given issue, as mitigated by a SME.

Certain aspects of various embodiments of the present invention provide advantages over existing knowledge preservation and transfer approaches at least because they capture real-time SME workflows with feedback and decision tracking to provide education and guidance for new administrators, who can encounter similar issues addressed by the SMEs, in a given computing environment. In some embodiments of the present invention, program code executing on one or more processor can generate a script and/or runbook, based on capturing real-time actions within a system by a given user to mitigate an issue, and provide the script and/or runbook to a subsequent user addressing a similar issue and/or the same issue or type of issue. These runbooks and/or scripts can includes not only the information (procedures) utilized to mitigate an issue, the information needed to approach the mitigation, but also what tools are available to address the issue, and how the procedures and/or processes in the runbook and/or script provide enable obtaining the data to get the information needed.

Embodiments of the present invention represent a practical application of various computing technologies to address a specific issue, which is knowledge loss over time, especially expert knowledge. Embodiments of the present invention enable the capture of the information that was previously known by an SME when mitigating a specific problem, including, but not limited to, the actions to take within the computing system, the tools to utilize, the results to expect at each point, during the mitigation. Thus, aspects of some embodiments of the present invention provide a practical solution to mitigating the loss of expertise in various matters. Due to attrition, users who provide expertise in various areas can depart and the institutional knowledge as well as the subject matter knowledge that they possess can be lost. The departure of SMEs introduces risk into the computing environment as less experienced users attempt to mitigate issue which were known to the SMEs. In addition, training costs are high for very specialized skills or require experience that can only obtained after many years. Because serious issues within a computing environment do not necessarily arise with great frequency, the only opportunities to learn how to resolve these issues are concurrent with the issues themselves. Thus, there are few opportunities to learn how to mitigate these issues in a hands-on manner. Embodiments of the present invention provide a practical solution to this issue by including program code that captures tasks and techniques used to address issues, to generate a runbook, thus, providing a way to transfer skills and knowledge to many people, over time.

FIG. 1 is a workflow 100 that illustrates various aspects of some embodiments of the present invention. This particular workflow 100 from the perspective of a user, within a system in which aspects of the present invention are implemented. FIG. 1 also present a certain example for better understanding of the user experience. However, this particular example is provided for illustrative purposes only and not to introduce any limitations regarding the users in a given computing system.

Referring to FIG. 1, in this example, four users utilize a given computing system, which can comprise multiple resources and is a shared computing environment which can include a cloud computing environment. Among the users are two SMEs, SME 1 has expertise in Product A, an element of the computing environment that can comprise software and/or hardware within the shared computing environment. SME 2 has expertise in Product B, another element of the computing environment that can comprise software and/or hardware within the shared computing environment. In an embodiment of the present invention, SME 1 and SME 2, at the same and/or at different times, encounter issues within Product A and Product B, respectively. This issue can be a production problem and/or a request to complete a given complex task, deployment, and/or configuration. Program code executing on one or more processors in the shared computing environment determines that the issues are present and that the SMEs (SME 1 and the SME 2) will mitigate the issue by utilizing tools available in the shared computing environment (105). In some embodiments of the present invention, the program code identifies a task or problem being investigated or worked on, by each SME, and/or a feature and/or capability being utilized by each SME. In order to identify the issue, the program code can prompt each SME to describe the issue (e.g., task) by making an auditory, textual, and/or haptic input into a computing interface utilized by the SME, to access resources of the shared computing environment, including but not limited to, a graphical user interface (GUI).

Returning to FIG. 1, the program code captures the activities of the SMEs in mitigating the issues (110). In this manner, the program code can generate real-time runbooks that can be utilized in the future to mitigate the issues. As will be explained, as a result of the program code capturing the activities of the SMEs, SME 1 and SME 2, users who are not independently knowledgeable or experienced in Product A and Product B will be able to utilize the captured activities of SME 1 and/or SME 2 to mitigate the issues mitigated by SME 1 and SME 2, in Product A and Product B, respectively. FIG. 1 illustrated two novice users, User 1, who is a novice at Product A, and User 2, who is a novice at Product B. Two SMEs are referenced throughout this figure and discussed in parallel although the issues mitigated by the SMEs can occur concurrently, consecutively, etc. The two issues are both discussed and the two SMEs only to illustrate that more than one runbook can be generated by the program code at a given time.

In capturing the activities (110), in some embodiments of the present invention, the shared computing environment includes a cognitive engine which executes program code that captures the activities of the SME. In some embodiments of the present invention program code executing on at least one processor that performs a cognitive analysis of the captured data, which can include one or more of structured and unstructured data, from a variety of sources (e.g., audio of user during issue mitigation, on screen (e.g., GUI) actions taken by user during mitigation, product(s) and/or application(s) utilized during mitigation, steps of mitigation, etc.).

As discussed above, in some embodiments of the present invention, the program code can utilize an existing cognitive agent to capture this data as well as to perform an analysis on the captured data, including generating the runbooks and/or scripts for issue mitigation, including but not limited to, IBM Watson®. For example, in some embodiments of the present invention, the program code interfaces with the application programming interfaces (APIs) that are part of a known cognitive agent, such as the IBM Watson® Application Program Interface (API), a product of International Business Machines Corporation, to identify relationships between the issue being mitigation and activities of an SME, including but not limited to actions initiated within the shared computing environment, tools utilized as part of the mitigation, audio of the user during the mitigation, video of the user during the mitigation, images of the user during the mitigation, and/or audio of the user during the mitigation. In some embodiments of the present invention, in order to process structured and unstructured data that informs the generation of the runbooks, APIs utilized by the one or more programs can include, but are not limited to, Retrieve and Rank (services available through the IBM Watson® Developer Cloud that can surface the most relevant information from a collection of documents), Natural Language Classifier, Natural Language Understanding, concepts/visual insights, trade off analytics, document conversion, Tone Analyzer, concepts/visual insights, relationship extraction, natural language processing, text to speech capabilities, and/or translation, and/or relationship extraction. Because in embodiments of the present invention, the data captured during issue mitigation by an SME can include, but is not limited to, audio, on-screen actions, products and/or applications being used, and SME's general steps and actions, the cognitive analysis tools, including those available through IBM Watson®, such as various APIs can be particularly helpful in parsing the data and generating a comprehensive procedure for mitigating the issue that can be followed by subsequent users, including those user who may not possess the level of expertise of the SME.

In some embodiments of the present invention, the program code captures the activities of the SMEs in mitigating the issues (110) which include the trial and error or trouble shooting steps that the SME takes to mitigate the issue. Although the program code can automatically enable a recording device on a computing interface within a range of the SME (based on identifying the SME as a user and identifying the user's associated device(s), including Internet of Things (IoT) devices within the vicinity of the SME), the program code can also prompt the SME to narrate the issue mitigation. In some embodiments of the present invention, the program code, upon recognizing that the SME is mitigating an issue in which the user is a SME, prompts the user, through an interface, to explain, verbally and/or textually, steps that the user is taking to mitigate the issue. As the cognitive engine include program code that can parse natural language, to increase efficiency, the program code can accept audio commentary and convert the commentary to text. In order to utilize audio data obtained from the user in a runbook, the program code can utilize an existing speech to text recognition algorithm, including by not limited to the Watson® Speech to Text API. The program code, through an interface, can prompt the SME to offer commentary on steps the user is taking to mitigate the issue, including but not limited to, what the user is reading, what the user is contemplating before, during, and after, taking certain actions, and what data the user is evaluating in making decision.

The architecture of the shared computing environment works in harmony with aspects of the present invention to enable the program code to gain a full view of actions initiated, within the system, by the SME. In some shared computing environments, the SME will mitigate an issue by accessing various services that execute on resources of the cloud. Thus, from the access point of the SME (i.e., the one or more computing devices utilized by the SME) the program code (of the cognitive engine) can observe and captures the movements of the SME from one product to another. Even if the SME utilizes certain local applications to mitigate an issue, because of the inter-connectivity of the shared computing environment, these actions are discoverable by the program code. In some embodiments of the present invention, for the privacy of the SME, the SME is alerted to when a data capture for issue mitigation is initiated, in some embodiments of the present invention, the SME consents, electronically, to the commencement of the capture, and in some embodiments of the present invention, the SME manually initiates the capture through a computing interface (e.g., a GUI).

In some embodiments of the present invention, a portion of the captured data are explanation for the navigation of a SME from one application and/or process to another (as observed by the program code), during issue mitigation. In addition to capturing audio to explain this navigation, in embodiments of the present invention, the program code can automatically request a text explanation from the SME when the program code observes the SME switching tools. In some embodiments of the present invention, when the program code determines that the SME has launched a new application, the program code launches a pop up query in a GUI the SME utilizes to access the new application. The pop up provides the user with a field into which to enter an explanation for the shift. The program code retains the entry for use in generating the runbook.

Activities captured by the program code can include attempts at mitigating an issue that are not ultimately successful. The SME can indicate to the program code which activities are not ultimately fruitful, and based on experiences during the mitigation, should be excluded from any runbook. For example, the SME could accidentally launch an unrelated program due to some confusion with icons on a desktop. In this case, the SME can indicate to the program code of the cognitive engine, via an audio, textual, and/or haptic entry. The program code can edit the captured data to exclude this activity. In some embodiments of the present invention, the SME can provide feedback that the SME is going back or restarting the investigation of the issue. The program code can also capture feedback from the SME as to why this path has been abandoned.

In some embodiments of the present invention, in addition to the activities undertaken by the SME alone, in the computing system, including usage of tools and applications and explanations provided by the SME (e.g., voice, text, etc.), the program code can also capture interactions with additional individuals utilizing the shared environment. Some issues within a shared computing system can require activities but multiple users with different permissions. For example, an SME who is deploying new features for a product for which the user in and SME may request another administrative user to stop and start various services running on servers in the environment, in order to implement and deploy the features. In complex environments, one individual, even if the individual is an SME could not have all the permissions and/or expertise to mitigate a given issue. Thus, the actions on the part of users who assist in the mitigation are also captured by the program code. In some embodiments of the present invention, the program code captures communications between the SME and other users and based on the content of the communications, initiates capture of subsequent actions by the other users. In order to determine whether to begin capturing activities by another user, the program code can parse the communications to the user from the SME, including but not limited to utilizing a known natural language processing algorithm (e.g., machine learning algorithms available through Watson®, Apache OpenNLP, Natural Language Toolkit (NLTK), Standford NLP, MALLET, Summarizer, Latent Dirichlet Allocation (LDA), and Sentiment Analysis, based on StanfordNLP) to determine whether collaboration is occurring between the users. Based on determining, based on applying an NLP algorithm, that collaboration is occurring, the program code additionally captures the activities (voice, actions in the computing system, tools utilized, etc.) of the user with whom the SME is communicating. In some embodiments of the present invention, the program code alerts the user that it will be capturing this data and/or the user agrees to the data capture, via a user interface. In some embodiments of the present invention, although additional users will not take actions within the computing system to mitigate the issue, the program code will capture conversations and communications between the users and the SME while the SME is mitigating the issue. In some embodiments of the present invention, the SME parses the recorded communications for relevancy to remove interchanges irrelevant to the issue mitigation. The program code can also utilize a classifier to determine where certain communications are not relevant to the issue mitigation and either delete these communications from being used to generate the runbook and/or suggest to the SME that these interactions be deleted and take this action or not based on the feedback provided from the SME. In case the SME realizes that the interactions with other users are not relevant to the issue mitigation, in embodiments of the present invention, the program code enables the SME to pause the recording/data capture. The SME can utilize these pause capability, provided through a user interface, any time the SME departs from mitigating this issue.

Returning to FIG. 1, in some embodiments of the present invention, the program code determines that the issues have been mitigated by the SMEs (120). In some embodiments of the present invention, the program code can make this determination automatically based on its continued capturing of the activities of the SME. The program code of the cognitive engine can make this determination from contextual information, including but not limited to, commands issued by the SME, content of text or audio input from the SME (offered contemporaneously with actions taken by the SME), a completion of a specific task indicative of an end of a routine, and/or another indication that the issue has been mitigated (or the task has been completed). In some embodiments of the present invention, the program code automatically determines that an SME has completed mitigation of an issue and in other embodiments of the present invention, the SME can provide a pre-defined input (e.g., certain phrase, certain textual input, certain audio expression) to indicate that the issue has been mitigated.

Based on determining that issues have been mitigated, the program code ceases capturing of the activities of the SMEs (130). Based on the captured data, the program code generates a runbook for each issue (140). The runbook can contain text and/or audio from the SME, indications of tasks that have been completed, and/or commands (e.g., key commands). In some embodiments of the present invention, the program code enables an SME to access a runbook in order to edit the resultant information, including but not limited to, editing to add and/or remove details. The program code retains the runbooks in a centrally accessible repository (150). In some embodiments of the present invention, the runbook is stored in a public area and is accessible to all users of the shared computing environment. In some embodiments of the present invention, before retaining the runbook, the program code sanitizes the runbook to remove all personally identifiable data such that making the runbook available to a controlled user group and/or the public does not present any security issues.

In some embodiments of the present invention, the reliability of the generated runbook for a given issue improves with time and use by other users. In some embodiments of the present invention, users encounter the issues which were previously mitigated by the SMEs (160). For example, User 1 can be responsible for mitigating an issue in Product A, while User 2 can be responsible for mitigating an issue in Product B. The program code determines, based on searching runbooks available in the centrally accessible repository that runbooks were generated by the program code for the issues (170). The program code provides the identified runbooks to the users (175). In some embodiments of the present invention, the runbook contains scripts that can be executed by the users to automatically implement some or all of the actions taken by the user. In other embodiments of the present invention, the runbook is a logically ordered simulation of the actions taken by the SME, with the audio recording of the explanations of the SME. In some embodiments of the present invention, the runbook is an electronic file that includes visuals and text to illustrate actions taken by the SME.

In some embodiments of the present invention, based on monitoring each user, the program code determines that each user has initiated usage of the runbook and is mitigating an issue of the issues (180). For each user, the program code obtains feedback based on the usage of the user of the runbook in mitigating the issue (190). In some embodiments of the present invention, the program code times the completion of various activities in the runbook by the user to rate the level of success. In some embodiments of the present invention, the program code solicits feedback from the user and allows the user to edit the runbook to improve the clarity and/or content, upon mitigating the issue. In some embodiments of the present invention, the program code of the cognitive engine monitors the user to compare the activities of the user in executing the runbook to the initial mitigation that was utilized to generate the runbook. The program code can combine the runbook with publicly available material about the product in which the issue is being mitigated, in order to enhance the experience of the user as well as the runbook. For example, if the user launches a query to clarify a portion of the runbook, the program code can augment the runbook with this query and the results, for future users. Thus, as it is utilized, each runbook is enhanced by the program code. The program code utilizes the feedback to enhance the runbook (195).

Figure 2:
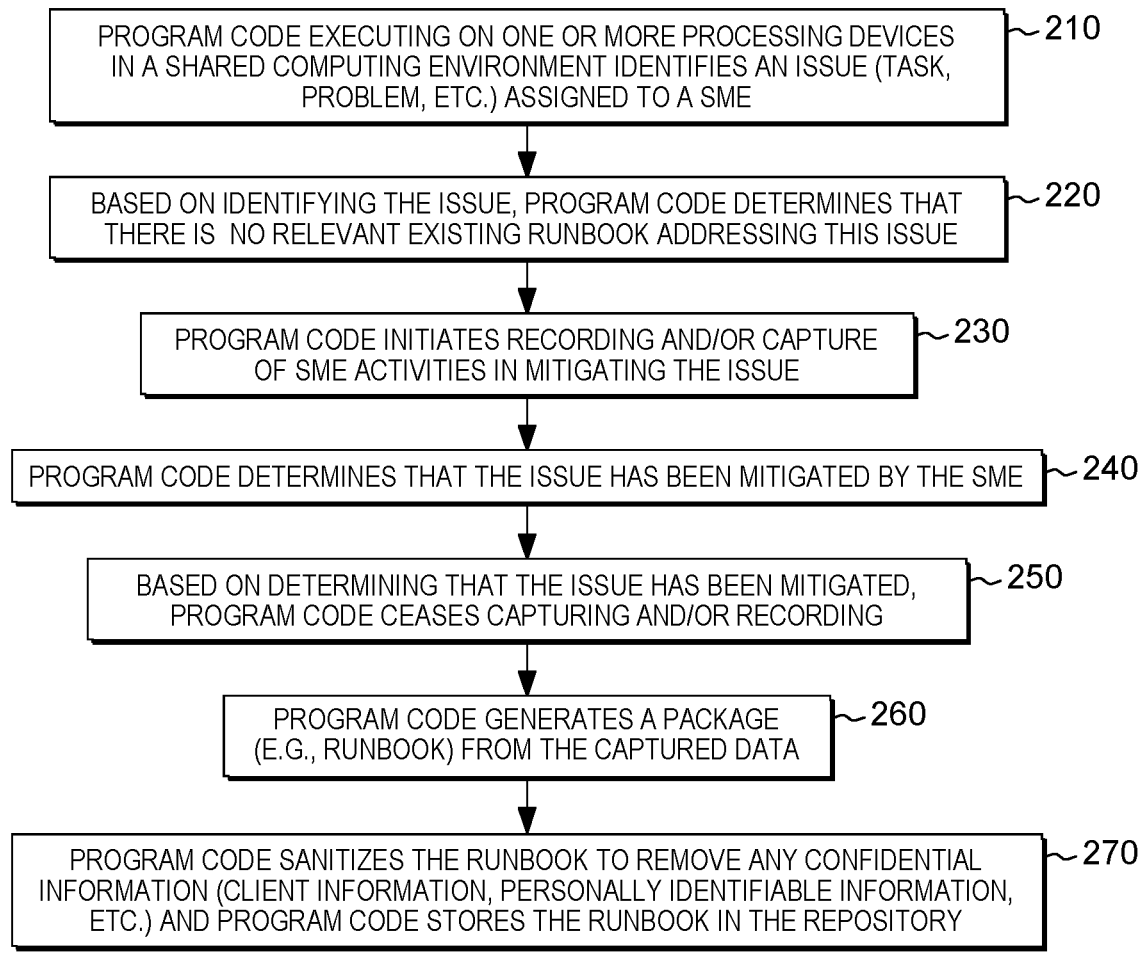
FIG. 2 is a workflow illustrating certain aspects of an embodiment of the present invention.

FIG. 2 is a workflow 200 that further illustrates certain aspects of some embodiments of the present invention. In some embodiments of the present invention, program code executing on one or more processing devices in a shared computing environment identifies an issue (task, problem, etc.) assigned to a SME (210). In some embodiments of the present invention, the SME can accept the issue through a ticketing system and the program code interfaces with the ticketing system to determine that a SME has accepted a given issue embodied in a ticket. The program code can also identify this issue based on input provided by the SME, including but not limited to, text, voice, a detection by a monitoring program providing an alert to the SME, a defect discovered by a monitoring program, content of an email received by an SME, etc. In some embodiments of the present invention, the SME, upon determining that there is an issue, provides the issue description to the program code, manually, through a user interface. In some embodiments of the present invention, the program code accesses a list of specific issues for which knowledge transfer data is desired and the program code identifies the issue based on a task being assigned to the SME from the list. In some embodiments of the present invention, the program code communicates with a systems monitoring program and based on the systems monitoring program providing an alert to the SME, the program code determines that an issue has been assigned to the SME.

Based on identifying the issue, the program code determines that there is no relevant existing runbook addressing this issue (220). In some embodiments of the present invention, the program code can query a centralized repository where existing runbooks are maintained by the program code, based on metadata associated with the issue and/or contextual information obtained from the SME (text, voice, etc.) to query the repository. The program code can return one or more runbooks to the user and the user can select a relevant runbook and/or indicate to the program code that there is no match. The determination that no runbook exists can also include the program code checking one or more of public and/or client databases for runbook usage. The program code can categorize the results of the query provided to the SME by contact peer organization. In some embodiments of the present invention, the available runbooks are indexed by different factors including product, issue, system, etc. The runbooks can be indexed based on user-solicited input and/or automatically by the program code based on the issue mitigation observed.

The program code initiates recording and/or capture of SME activities in mitigating the issue (230). The scope of the activities captured is explained in more detail in the description of FIG. 1, however, the data captured can include communication sessions between the SME and other SMEs and/or peers (i.e., other users). The program code provides the SME with the ability to pause the capture and/or recording functionality. In some embodiments of the present invention, the data captured by the program code includes, but is not limited to, the product(s) and/or application(s) utilized, audio provided by the SME to narrate the mitigation, and/or steps and actions taken during the mitigation. In some embodiments of the present invention, the program code determines, based on monitoring the activity of the SME during the mitigation, that there is a pause in the activity. For example, the SME may not speak and/or take any other action for a predetermined period of time. Thus, the program code is not capturing activities for a given period. When this occurs, the program code can prompt the user to provide an explanation for the pause. The prompt can be textual, audio, haptic, etc. The program code prompts the SME to explain this pause. The SME could explain that the pause is for reading, thinking, evaluating, etc. Thus, rather the data capture providing a false impression that no action is taken at a given time in the mitigation, the explanation could fill in this gap and provide a future user of the resultant runbook with useful insight into the mitigation of the issue.

In addition to requesting data explaining a pause in activity, the program code can also prompt a SME for further data (explanation) when the SME moves from one product/tool/application to another. In some embodiments of the present invention, the program code determines that this activity has occurred and prompts the user for an explanation, including but not limited to, by launching a pop up window on an interface utilized by the SME.

In some embodiments of the present invention, recording and/or capture of SME activities in mitigating the issue (230) includes capturing activities that are ultimately dead ends. A SME can attempt certain paths in mitigation that do not pan out. In some situations, these paths still have values for exploration, but for others, while taking them, the SME learns that they are not relevant. In embodiments of the present invention, the program code can capture this information (so that the SME can share it in a runbook) based on obtaining feedback from the SME. For example, the SME can provide feedback to the program code, contemporaneous with or after an activity that the SME is going back and restarting an investigation after hitting a dead end. The SME provides data (and can be prompted to provide data) indicating why a given path (tool, command, action, etc.) was a dead end in an attempt to mitigate the issue.

In some embodiments of the present invention, the commands ultimately compiled by the program code into a runbook include spoken commands by the SME. The SME can provide these commands through an interface while mitigating the issue. The program code captures these spoken commands, which can be converted to text, for inclusion in the runbook, utilizing a speech to text utility (e.g., IBM Watson®). In some embodiments of the present invention, the audio itself is integrated into the runbook by the program code. In some embodiments of the present invention, although the SME enters commands and interacts with an interface without providing audio, the program code can utilize voice emulation software to provide audio of the commands entered by the SME in mitigating the issue. In this way, the runbook can provide audio guidance to a user whether or not the SME narrated the SME's actions through a computing interface to mitigate the issue when the program code captured the SME's activities. In many situations, the work of the SME can include a certain amount of trial and error. In these situations it could be helpful to capture explanations, either from the audio of the SME, or via a voice emulation from the steps taken, so that these portions of the issue mitigation were clear to an eventual user of the runbook.

The program code determines that the issue has been mitigated by the SME (240). The program code can make this determination based on text and/or audio from the SME, an indication through a user interface that the issue has been mitigated, and/or an initiation of certain command by the SME. Based on determining that the issue has been mitigated, the program code ceases capturing and/or recording (250). The program code generates a package (e.g., runbook) from the captured data (260).

In some embodiments of the present invention, before making the runbook available to all users of the shared computing environment or otherwise publicly available, the program code provides the runbook in a staging area for verification and testing by users. Given that certain of the issues can occur infrequently in a production environment, providing the runbook in a test environment where the issue can be simulated repeatedly allows users to troubleshoot the runbook. During the testing, the program code solicits feedback from these users and collects data, including but not limited to, the satisfaction of the users with the runbook to mitigate the issue, and the recognition of issues with the data, including risks based on perceived directions. The program code can track the users testing the runbook and determine that the runbook has been verified after it has been tested by a certain number of users with a certain amount of experience and/or after the runbook has been accessed, in general, a predetermined number of times and/or after the runbook has been available in the staging area for the predetermined period of time. In some embodiments of the present invention, test users can edit the runbook to clarify and/or streamline various aspects.

In some embodiments of the present invention, the program code augments the runbook with data related to the users participating in the testing and the experiences of these users. This feedback can be provided to users who subsequently utilize a runbook. The data can also be utilized to disqualify a user from utilizing a given runbook. For example, if a given user is of a low level of expertise within a given product (e.g., as indicated by the permissions of the user in the product), the program code could not match the runbook to a user with a similar level of experience with the product. In general, the program code can rank the efficacy of the runbook. In embodiments of the present invention, the program code monitors the runbook as it is utilized by a given number of users with a given number of years of experience in relevant technologies (this information can be solicited from a user and/or inferred from permissions of a user within the product or by designation within a user authentication system utilized within the shared computing environment). The program code can provide a user who has utilized the runbook with a survey and with these results, gage the level of satisfaction of the user. If there are certain portions of the runbook of a complexity that is not comprehended based on monitoring lower level users attempt the portions during testing, the program code can supplement the runbook with a warning not to perform these tasks or commands without a certain amount of experience and can encourage users to contact a higher level user for guidance.

Returning to FIG. 2, the program code sanitizes the runbook to remove any confidential information (client information, personally identifiable information, etc.) and the program code stores the runbook in the repository (270). In some embodiments of the present invention, the program code stores the sanitized runbook in the public domain.

In some embodiments of the present invention, the program code checks additional public sources and knowledge bases for data relevant to the issue. In some embodiments of the present invention this data can be integrated into a runbook and/or provided to a user in conjunction with the runbook, when a user is attempting to mitigate an issue.

Figure 3:
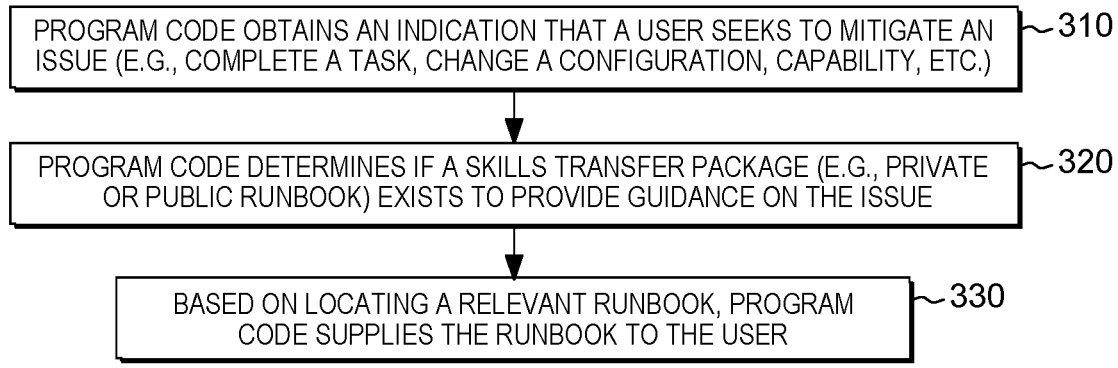
FIG. 3 is a workflow illustrating certain aspects of an embodiment of the present invention.

FIG. 3 provides a workflow 300 experienced by a user seeking a skills transfer in order to mitigate a given issue within a shared computing system into which aspects of some embodiments of the present invention have been implemented. In some embodiments of the present invention, the program code obtains an indication that a user seeks to mitigate an issue (e.g., complete a task, change a configuration, capability, etc.) (310). In some embodiments of the present invention, the program code also determines whether the user is an SME or a novice user. For example, the program code can access a user management system to obtain any user level assigned to the user within the system. Additionally, in some embodiments of the present invention, the program code can determine how long ago the user received permission to access the product in which the issue is to be mitigated. Based on determining that the permission were obtained recently (e.g., within the last month, week, day, any predetermined period), the program code can determined that the user is a novice.

The program code determines if a skills transfer package (e.g., private or public runbook) exists to provide guidance on the issue (320). In some embodiments of the present invention, the program code searches both publicly and privately available repositories of a relevant runbook. In order to identify an appropriate runbook, the program code can prompt the user, through an interface, to provide additional information related to the user's expertise level and the issue the user seeks to mitigate. By determining whether there is a runbook available for a given issue, the program code determines if a vehicle for skills transfer exists for the given issue (and/or associated skills to mitigate the issue). Based on locating a relevant runbook, the program code supplies the runbook to the user (330). The program code can provide the user with the location of the runbook and/or can initiate the runbook automatically in an interface utilized by the user. The program code can solicit feedback from the user based on the user's experience utilizing the runbook and can preserve the feedback as a rating for the runbook. In the case that a runbook receives poor feedback (within a defined threshold), the program code can automatically generate a new runbook to replace this runbook when the program code determines that an SME is mitigating an issue.

Figure 4:
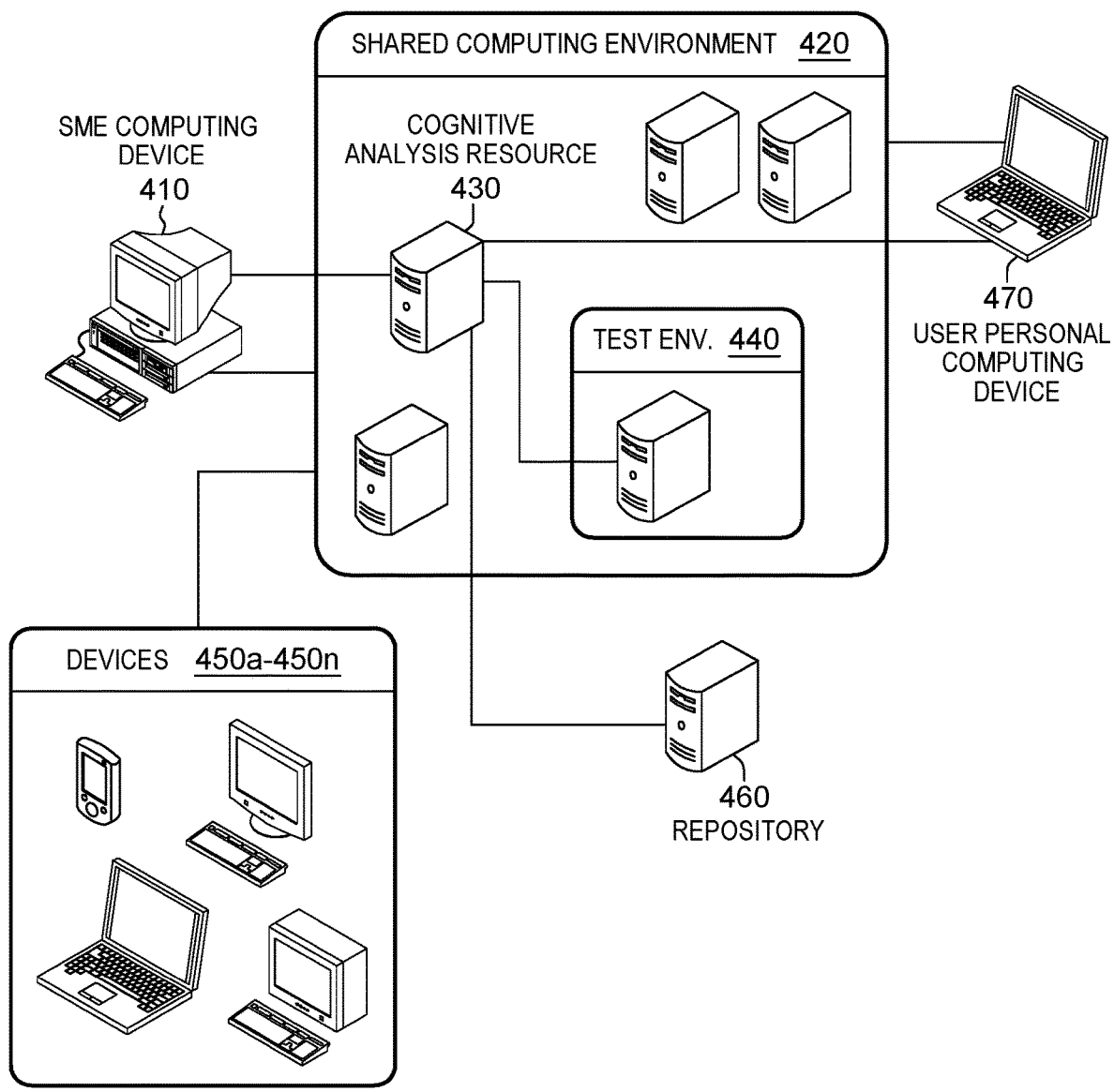
FIG. 4 is a technical environment into which certain aspects of the present invention can be implemented.

FIG. 4 illustrates a technical environment 400 into which aspects of some embodiments of the present invention can be integrated. In an embodiment of the present invention, a user who is an SME utilizes a computing device 410 with an interface to interact with various resources of a shared computing environment 420, including but not limited to a cloud computing environment. The resources of the shared computing environment 420 include various tools (e.g., applications, software, hardware, processes) the SME utilizes in mitigating an issue. One or more computing resources executing program code that performs a cognitive analysis 430 (e.g., a cognitive engine) monitor, capture, and enable resources proximate to the SME, such as those of the computing device 410 (e.g., audio and video interfaces) to capture elements of the SME's process that enable the program code to generate a runbook addressing the issue that the SME addressing utilizing interfaces available via the computing device 410. Once a runbook is generated by the program code, the program code makes the runbook available in a test environment 440 comprised of computing resources that can be part of the shared computing environment 420 and/or accessible to resources utilizing the shared computing environment 420. Various users access the runbook in the test environment 440, utilizing various personal computing devices 450a-450n. The users provide feedback, which is integrated into the runbook and the runbook is then saved, by the program code removes any confidential data from the runbook and stores the sanitized runbook in a repository 460, which can be on a publicly accessible resource. The repository 460 can be a resource of the shared computing environment 420 and/or it can be a public resource to which authenticating to the shared computing environment 420 is not necessary for access. When the program code determines that a user accessing the shared computing environment 420 is mitigating an issue for which there is a runbook, the program code provides the runbook to the user, based on communicating with the user through a user interface executing on a personal computing device of the user 470.

Embodiments of the present invention include a computer-implemented method, a computer program product, and a computer system, where program code executing on one or more processors in a shared computing environment monitors tasks performed within the shared computing environment by an authorized user via at least one interface of a computing system. The program code determines, based on the monitoring, that the authorized user is initiating a given task, where the given task is a recurring administrative task within the shared computing environment. The program code queries a repository accessible to the one or more processors in a shared computing environment to determine if the repository comprises a runbook comprising guidance relevant to the given task. Based on the querying, the program code determines that the repository does not comprise the runbook. Based on the determining, the program code automatically initiates one or more devices of the computing system to capture and cognitively analyze activities performed by the authorized user to complete the given task, where the one or more devices comprise an audio capture device and a screen recorder. The program code determines, based on the monitoring, that the authorized user has completed the given task. The program code stops the capturing by the one or more devices of the activities performed by the authorized user. The program code generates the runbook comprising the guidance relevant to the given task from the captured activities.

In some embodiments of the present invention, the program code obtains a notification that a user is initiating the given task. The program code provides the runbook to the user.

In some embodiments of the present invention, the program code determines that the authorized user is initiating the given task comprises. The program code monitors the authorized user accepting an assignment to complete the given task through a ticketing system accessible via the computing system.

In some embodiments of the present invention, the program code determines that the authorized user is initiating the given task by: obtaining input from the authorized user, via the at least one interface, identifying the given task.

In some embodiments of the present invention, the program code determines that the authorized user is initiating the given task by: intercepting an alert provided to the at least one interface by one or more programs monitoring hardware and software elements of the shared computing environment.

In some embodiments of the present invention, the runbook comprises elements selected from the group consisting of: audio generated by the authorized user, captured by the audio capture device, contemporaneously with the authorized user performing the task, commands executed by the authorized user through the at least one interface, tools executed by one or more computing resources comprising the shared computing environment, accessed by the authorized user through the at least one interface, screen movements, captured by the screen recorder, executed by the authorized user in the at least one interface, and text generated by the authorized user contemporaneously with the authorized user performing the task.

In some embodiments of the present invention, the program code capturing and cognitively analyzing the activities further comprising: determining, based on the monitoring, that the authorized user has changed from utilizing a first tool through the at least one interface to utilizing a second tool through the at least one interface, where the first tool and the second tool comprise tools executed by one or more computing resources comprising the shared computing environment; prompting the authorized user, through the at least one interface, to provide an explanation for the change; and capturing the explanation for use in generating the runbook.

In some embodiments of the present invention, the program code prompting includes: displaying a pop-up input field in the at least one interface to accept the explanation via text input by the authorized user.

In some embodiments of the present invention, the program code deploys the runbook in a test environment. The program code simulates an event to be mitigated by completing the given task in the test environment. The program code monitors usage of the runbook to complete the task in the test environment, where the monitoring comprises collecting statistics reflecting a success rate of utilizing the runbook to complete the task.

In some embodiments of the present invention, the program code determines that the collected statistics reflect a success rate above a pre-determined threshold for the runbook. Based on the determining, the program code deploys the runbook to the repository.

In some embodiments of the present invention, the program code deploying includes: the program code indexing the runbook in the repository such that it can be identified based on the querying.

In some embodiments of the present invention, the program code provides to the authorized user, through the at least one interface, a mechanism to stop and restart the capture of the activities.

In some embodiments of the present invention, the program code provides, to the authorized user, through the at least one interface, a method to edit contents of the runbook.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the cognitive analysis resource 430 (FIG. 4), the various resources of the shared computing environment 420 (FIG. 4), the personal devices 410, 450a-450n, 470 (FIG. 4) and the repository 460 (FIG. 4), can each be understood as a cloud computing node 10 (FIG. 7) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 7:
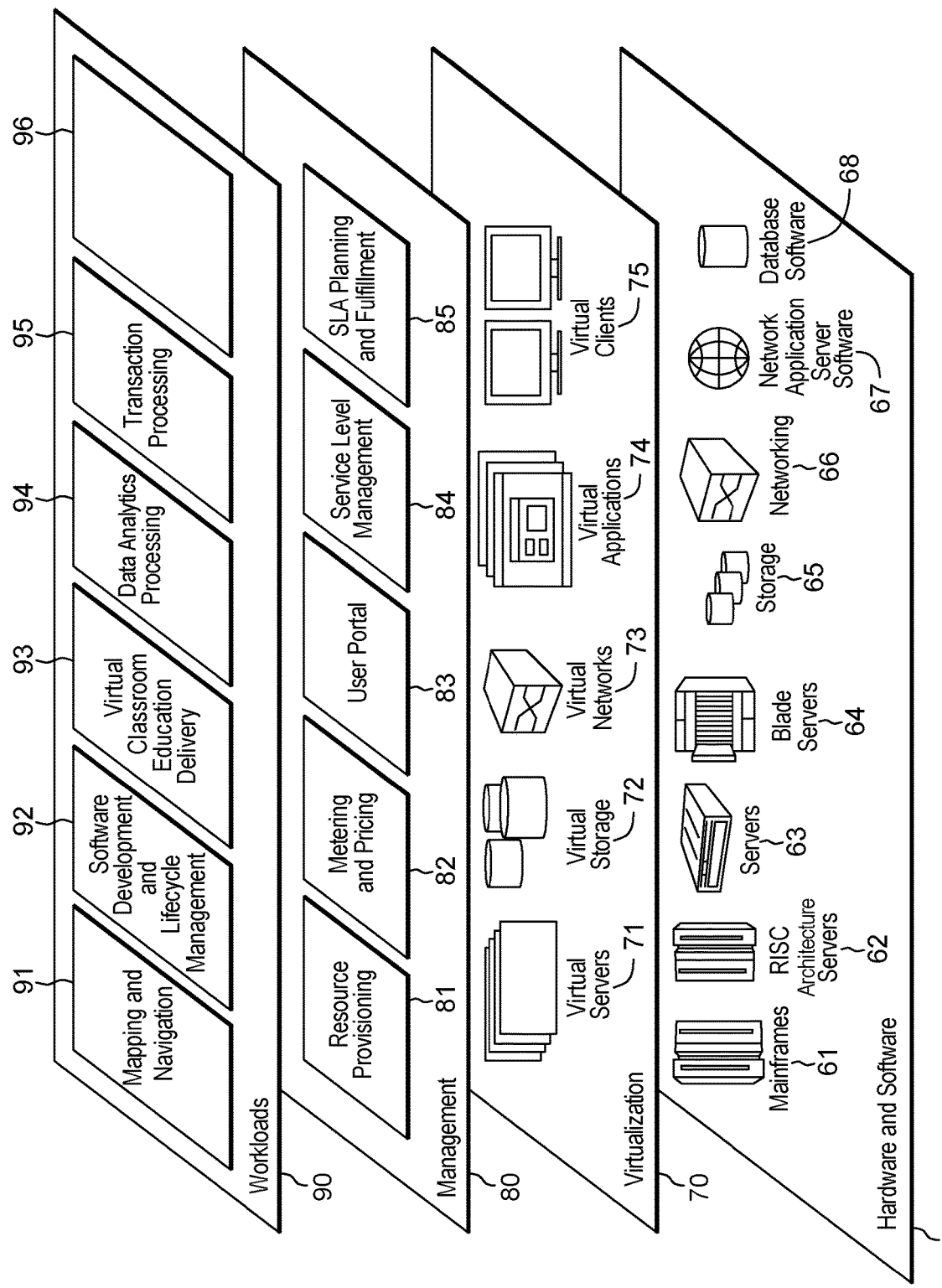
FIG. 7 depicts abstraction model layers according to an embodiment of the present invention.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a runbook for assistance in knowledge transfer 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
monitoring, by one or more processors in a shared computing environment, tasks performed within the shared computing environment by an authorized user via at least one interface of a computing system;
determining, by the one or more processors, based on the monitoring, that the authorized user is initiating a given task, wherein the given task is a recurring administrative task within the shared computing environment;
querying, by the one or more processors, a repository accessible to the one or more processors in a shared computing environment to determine if the repository comprises a runbook comprising guidance relevant to the given task;
based on the querying, determining that the repository does not comprise the runbook;
based on the determining that the repository does not comprise the runbook, automatically initiating one or more devices of the computing system to capture contemporaneously with an authorized user performing activities to complete the given task, the activities performed by the authorized user to complete the task, and to cognitively analyze the activities performed by the authorized user to complete the given task, wherein the capturing comprises capturing structured and unstructured data comprising audio of the authorized user, and wherein the one or more devices comprise an audio capture device and a screen recorder, wherein the capturing and cognitively analyzing the activities comprises:
determining, by the one or more processors, based on the monitoring, that the authorized user has changed from utilizing a first tool through the at least one interface to utilizing a second tool through the at least one interface, wherein the first tool and the second tool comprise application programming interfaces and tools executed by one or more computing resources comprising the shared computing environment, wherein the first tool and the second tool comprise software applications launched by the authorized user to address the recurring administrative task;

in response to the user utilizing the second tool:

prompting, by the one or more processors, the authorized user, through the at least one interface, to provide an audio explanation for the changing from utilizing the first tool through the at least one interface to utilizing the second tool through the at least one interface;

capturing, by the audio capture device, the audio explanation for use in generating the runbook;

launching, by the one or more processors, a pop-up window in the at least one interface, wherein the pop up window comprises a field into which the user can enter an explanation for the changing from utilizing the first tool to utilizing the second tool to address the administrative task; and retaining, by the one or more processors, the explanation entered in the field and using the explanation entered in the field in generating the runbook;

determining, by the one or more processors, based on the monitoring, that the authorized user has completed the given task, wherein completing the given task comprised comprises utilizing the first tool and utilizing the second tool, wherein the monitoring comprises obtaining a pre-defined audio input, that the authorized user has completed the given task;

based on the determining that the authorized user has completed the given task, stopping, by the one or more processors, the capturing by the one or more devices of the activities performed by the authorized user; and generating, by the one or more processors, the runbook comprising the guidance relevant to the given task from the captured activities, wherein the runbook comprises a logically ordered simulation of the activities performed by the authorized user to complete the given task comprising an audio recording of the audio explanation;

obtaining, by the one or more processors, a notification that a user is initiating the given task;

based on the obtaining, providing, by the one or more processors, the runbook; and initiating, by the one or more processors, the runbook, wherein the initiating comprises initiating the simulation with the audio explanation.

2. The computer-implemented method of claim 1, wherein the determining that the authorized user is initiating the given task comprises:

monitoring the authorized user accepting an assignment to complete the given task through a ticketing system accessible via the computing system.

3. The computer-implemented method of claim 1, wherein the determining that the authorized user is initiating the given task comprises:

obtaining, by the one or more processors, input from the authorized user, via the at least one interface, identifying the given task.

4. The computer-implemented method of claim 1, wherein the determining that the authorized user is initiating the given task comprises:

intercepting, by one or more processors, an alert provided to the at least one interface by one or more programs monitoring hardware and software elements of the shared computing environment.

5. The computer-implemented method of claim 1, wherein the runbook further comprises an element selected from the group consisting of: audio generated by the authorized user, captured by the audio capture device, contemporaneously with the authorized user performing the task, commands executed by the authorized user through the at least one interface, tools executed by one or more computing resources comprising the shared computing environment, accessed by the authorized user through the at least one interface, screen movements, captured by the screen recorder, executed by the authorized user in the at least one interface, and text generated by the authorized user contemporaneously with the authorized user performing the task.

6. The computer-implemented method of claim 1, wherein the initiating further comprises:

deploying, by the one or more processors, the runbook in a test environment;

simulating, by the one or more processors, an event to be mitigated by completing the given task in the test environment; and monitoring, by the one or more processors, usage of the runbook to complete the task in the test environment, wherein the monitoring comprises collecting statistics reflecting a success rate of utilizing the runbook to complete the task.

7. The computer-implemented method of claim 6, further comprising:

determining, by the one or more processors, that the collected statistics reflect a success rate above a predetermined threshold for the runbook; and based on the determining that the collected statistics reflect the success rate, deploying, by the one or more processors, the runbook to the repository.

8. The computer-implemented method of claim 7, wherein the deploying comprises:

indexing, by the one or more processors, the runbook in the repository such that it can be identified based on the querying.

9. The computer-implemented method of claim 1, further comprising:

providing, by the one or more processors, to the authorized user, through at least one interface, a mechanism to stop and restart the capture of the activities.

10. The computer-implemented method of claim 1, further comprising:

providing, by the one or more processors, to the authorized user, through at least one interface, a method to edit contents of the runbook.

11. A computer program product comprising:

a computer readable storage medium readable by one or more processors and storing instructions for execution by the one or more processors for performing a method comprising:

monitoring, by the one or more processors in a shared computing environment, tasks performed within the shared computing environment by an authorized user via at least one interface of a computing system;

determining, by the one or more processors, based on the monitoring, that the authorized user is initiating a given task, wherein the given task is a recurring administrative task within the shared computing environment, wherein the given task comprises mitigating an issue within the shared computing environment;

querying, by the one or more processors, a repository accessible to the one or more processors in a shared computing environment to determine if the repository comprises a runbook comprising guidance relevant to the given task;

based on the querying, determining that the repository does not comprise the runbook;

based on the determining that the repository does not comprise the runbook, automatically initiating one or more devices of the computing system to capture contemporaneously with an authorized user performing activities to complete the given task, the activities performed by the authorized user to complete the task, and to cognitively analyze the activities performed by the authorized user to complete the given task, wherein the capturing comprises capturing structured and unstructured data comprising audio of the authorized user, wherein the one or more devices comprise an audio capture device and a screen recorder, wherein the activities performed by the authorized user comprise inputs made by the user into one or more applications to mitigate the issue, and wherein the inputs mitigate the issue, wherein the capturing and cognitively analyzing the activities comprises:
- determining, by the one or more processors, based on the monitoring, that the authorized user has changed from utilizing a first tool through the at least one interface to utilizing a second tool through the at least one interface, wherein the first tool and the second tool comprise application programming interfaces and tools executed by one or more computing resources comprising the shared computing environment, wherein the first tool and the second tool comprise software applications launched by the authorized user to address the recurring administrative task;
- in response to the user utilizing the second tool:
  - prompting, by the one or more processors, the authorized user. through the at least one interface, to provide an audio explanation for the changing from utilizing the first tool through the at least one interface to utilizing the second tool through the at least one interface;
  - capturing, by the audio capture device, the audio explanation for use in generating the runbook;
  - launching, by the one or more processors, a pop-up window in the at least one interface, wherein the pop up window comprises a field into which the user can enter an explanation for the changing from utilizing the first tool to utilizing the second tool to address the administrative task; and
  - retaining, by the one or more processors, the explanation entered in the field and using the explanation entered in the field in generating the runbook;
- determining, by the one or more processors, based on the monitoring, that the authorized user has completed the given task, wherein completing the given task comprises utilizing the first tool and utilizing the second tool, wherein the monitoring comprises obtaining a pre-defined audio input, that the authorized user has completed the given task;
- based on the determining that the authorized user has completed the given task, stopping, by the one or more processors, the capturing by the one or more devices of the activities performed by the authorized user;

generating, by the one or more processors, the runbook comprising the guidance relevant to the given task from the captured activities, wherein the runbook comprises a logically ordered simulation of the activities performed by the authorized user to complete the given task comprising an audio recording of the audio explanation;

obtaining, by the one or more processors, a notification that a user is initiating the given task;

based on the obtaining, providing, by the one or more processors, the runbook; and initiating, by the one or more processors, the runbook, wherein the initiating comprises initiating the simulation with the audio explanation.

12. The computer program product of claim 11, wherein the determining that the authorized user is initiating the given task comprises;
- monitoring the authorized user accepting an assignment to complete the given task through a ticketing system accessible via the computing system.

13. The computer program product of claim 11, wherein the determining that the authorized user is initiating the given task comprises:
- obtaining, by the one or more processors, input from the authorized user, via the at least one interface, identifying the given task.

14. The computer program product of claim 11, wherein the determining that the authorized user is initiating the given task comprises:
- intercepting, by one or more processors, an alert provided to the at least one interface by one or more programs monitoring hardware and software elements of the shared computing environment.

15. A system comprising:
- a memory;
- one or more processors in communication with the memory;
- program instructions executable by the one or more processors via the memory to perform a method, the method comprising:
  - monitoring, by the one or more processors in a shared computing environment, tasks performed within the shared computing environment by an authorized user via at least one interface of a computing system;
  - determining, by the one or more processors, based on the monitoring, that the authorized user is initiating a given task, wherein the given task is a recurring administrative task within the shared computing environment, wherein the given task comprises mitigating an issue within the shared computing environment;
  - querying, by the one or more processors, a repository accessible to the one or more processors in a shared computing environment to determine if the repository comprises a runbook comprising guidance relevant to the given task;
  - based on the querying, determining that the repository does not comprise the runbook;
  - based on the determining that the repository does not comprise the runbook, automatically initiating one or more devices of the computing system to capture contemporaneously with an authorized user performing activities to complete the given task, the activities performed by the authorized user to complete the task, and to cognitively analyze the activities performed by the authorized user to complete the given task, wherein the capturing comprises capturing structured and unstructured data comprising audio of the authorized user, wherein the one or more devices comprise an audio capture device and a screen recorder, wherein the activities performed by the authorized user comprise inputs made by the user into one or more applications to mitigate the issue, and wherein the inputs mitigate the issue, wherein the capturing and cognitively analyzing the activities comprises:

determining, by the one or more processors, based on the monitoring, that the authorized user has changed from utilizing a first tool through the at least one interface to utilizing a second tool through the at least one interface, wherein the first tool and the second tool comprise application programming interfaces and tools executed by one or more computing resources comprising the shared computing environment, wherein the first tool and the second tool comprise software applications launched by the authorized user to address the recurring administrative task;

in response to the user utilizing the second tool:
prompting, by the one or more processors, the authorized user, through the at least one interface, to provide an audio explanation for the changing from utilizing the first tool through the at least one interface to utilizing the second tool through the at least one interface;

capturing, by the audio capture device, the audio explanation for use in generating the runbook;

launching, by the one or more processors, a pop-up window in the at least one interface, wherein the pop up window comprises a field into which the user can enter an explanation for the changing from utilizing the first tool to utilizing the second tool to address the administrative task; and retaining, by the one or more processors, the explanation entered in the field and using the explanation entered in the field in generating the runbook;

determining, by the one or more processors, based on the monitoring, that the authorized user has completed the given task, wherein completing the given task comprises utilizing the first tool and utilizing the second tool, wherein the monitoring comprises obtaining a pre-defined audio input, that the authorized user has completed the given task;

based on the determining that the authorized user has completed the given task, stopping, by the one or more processors, the capturing by the one or more devices of the activities performed by the authorized user;

generating, by the one or more processors, the runbook comprising the guidance relevant to the given task from the captured activities, wherein the runbook comprises a logically ordered simulation of the activities performed by the authorized user to complete the given task comprising an audio recording of the audio explanation;

obtaining, by the one or more processors, a notification that a user is initiating the given task;

based on the obtaining, providing, by the one or more processors, the runbook; and initiating, by the one or more processors, the runbook, wherein the initiating comprises initiating the simulation with the audio explanation.

\* \* \* \* \*